(No Model.)
W. H. DINSMORE.
NUT LOCK.
No. 311,879. Patented Feb. 10, 1885.
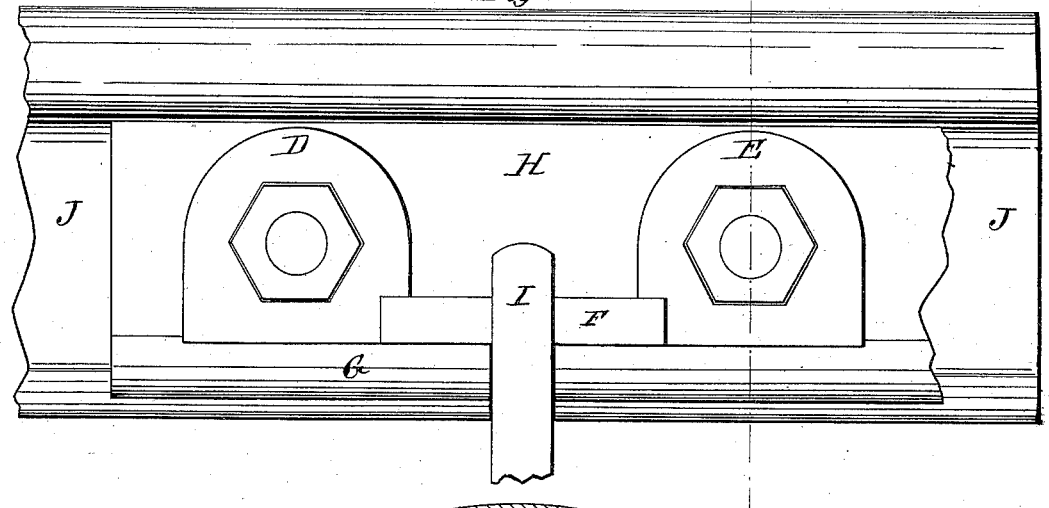
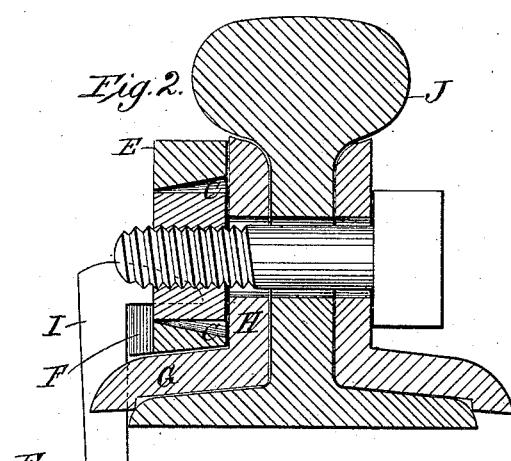
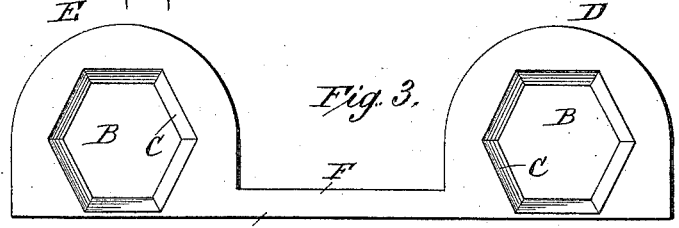
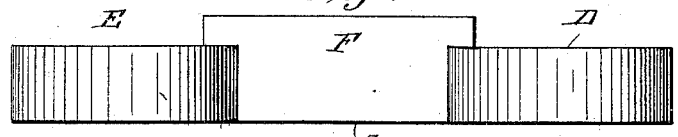
WITNESSES:
W. W. Hollingsworth
A. G. Lyne
INVENTOR:
Wm. H. Dinsmore
BY Munn & Co.
ATTORNEYS.

UNITED STATES PATENT OFFICE.

WILLIAM H. DINSMORE, OF CONNELLSVILLE, PENNSYLVANIA.

NUT-LOCK.

SPECIFICATION forming part of Letters Patent No. 311,879, dated February 10, 1885.

Application filed May 17, 1884. (No model.)

*To all whom it may concern:*

Be it known that I, WILLIAM H. DINSMORE, of Connellsville, in the county of Fayette and State of Pennsylvania, have invented a new and useful Improvement in Nut-Locks, of which the following is a full, clear, and exact description, reference being had to the annexed drawings, forming part of this specification.

This invention relates to gang nut-locks for railways, in which a plate or bar having openings therein is adapted to be fitted over the nuts after they are screwed up, to prevent them from becoming loose.

In the drawings, Figure 1 is a side elevation of part of a railway-track, showing my invention. Fig. 2 is a cross-section of the same. Fig. 3 is an elevation of the lock detached, showing the side opposite to that shown in Fig. 1; and Fig. 4 is a plan view of the same.

The object of my invention is to provide a nut-lock which shall inclose each of the nuts snugly on all sides, to equalize the strain on the lock, and which at the same time shall be capable of being placed on the nuts easily.

In order to provide for the contraction and expansion of railway-rails under heat and cold, it is customary to make the bolt-holes in the rails or fish-plates somewhat larger in diameter than the bolts. This necessary construction, however, allows the bolts, when they are being inserted through the rails and fish-plates to connect two rails together, to assume positions in which they may not be parallel with each other. For instance, one bolt may be inclined slightly upward from a horizontal plane and the other downward, or the two bolts may slightly incline toward or from each other. Now, it will be readily understood that if the holes in the locking plate or bar for receiving the nuts are made to correspond only with the normal positions of the nuts, the bolts will need to be carefully adjusted before the plate can be passed over the nuts. The same difficulty arises where a long slot instead of holes is formed in the plate for the nuts. To meet this objection to the ordinary locking-plate, I provide the plate A with openings B, which are equal in diameter to the nuts at the outer side of the plate, but which are larger in diameter than the nuts at the inner side of the plate. These openings B are formed with sloping walls C, converging toward each other at the outer side of the plate, and which serve as guides for drawing the nuts, and thereby the bolts, to the centers of the openings when the plate is driven or pressed into engagement with the nuts. The degree of convergence in the walls of the openings B should be such that the openings will partially receive the nuts even when the bolts are at their greatest inclination from the normal position. A slight tap with a hammer or pressure with the hand will be sufficient to place the plate on the nuts, requiring no fumbling or adjusting of bolts, which are particularly objectionable in winter when the hands of the operatives are apt to be numb from cold.

Another objection to the usual form of locking-plate is, that when placed on the nuts it fits in between the upper and lower flanges of the rail, in which position, owing to its broad rectangular shape, it presents no prominent part which can be grasped by the hand in adjusting or removing the same. The practicability of such a locking-plate depends in great measure on the facility it affords for handling the same without inconvenience and loss of time. I therefore form my locking-plate of two rounded parts, D E, through which the openings B are formed, and a connecting-bar, F, which connects these two parts together at their bases. This construction secures the desired object of having the lock to completely embrace the nuts on all sides, so that the strain on the lock shall be equally distributed, while the external surfaces of these rounded parts, hoods, or caps, which embrace the nuts afford convenient handles by which the plate may be securely grasped when it is desired to remove the lock.

The location of the connecting-bar F at the base of the lock, instead of elsewhere, secures two important results: first, it is thus adapted to rest on the flange G of the fish-plate H, forming a continuous base-piece which adds to the strength of the lock; and, second, it affords a means of securing the lock in position by the spike I, which is employed for securing the fish-plate H and rail J. By this construction I not only secure economy of material, making a comparatively light but substantial lock, but I also dispense with the need of special or additional means for securing the lock in position.

I am aware that spikes have before been employed for securing nut-locks in place, and I do not claim this broadly.

I am also aware that nut-locking plates having parts adapted to partially embrace the nuts have been employed. Such construction, however, does not admit of the use of the openings having converging walls for drawing the nuts and bolts into proper position.

What I claim is—

A nut-locking plate consisting of the hoods D E, having openings B formed with outwardly-converging walls for encircling and drawing the nuts into proper position, and the straight bar F, connecting said hoods together at their bases, substantially as shown and described.

WILLIAM H. DINSMORE.

Witnesses:
FRANCIS H. QUICK,
JOHN U. WRAGG.